INVENTOR.
Otakar P. Prachar
BY
Paul Fitzpatrick
ATTORNEY

INVENTOR.
Otakar P. Prachar
BY Paul Fitzpatrick
ATTORNEY

Sept. 4, 1962  O. P. PRACHAR  3,052,095
LIQUID VAPOR FUEL SYSTEM
Filed Sept. 11, 1959  3 Sheets-Sheet 3

INVENTOR.
Otakar P. Prachar
BY
Paul Fitzpatrick
ATTORNEY 3,052,095
LIQUID VAPOR FUEL SYSTEM
Otakar P. Prachar, Indianapolis, Ind., assignor to General Motors Corporation, Detroit, Mich., a corporation of Delaware
Filed Sept. 11, 1959, Ser. No. 839,345
15 Claims. (Cl. 60—39.28)

My invention relates to fuel systems adapted to handle fuel in liquid and vapor phases concurrently and compatibly, and to improved means for handling fuel in vapor or gaseous form. The invention is particularly suitable to the requirements of high speed aircraft employing turbojet or other air-breathing jet engines, and is described herein in terms of its preferred embodiment in a fuel system for a turbojet engine having an afterburner.

It will be apparent, however, that the invention is applicable to various types of engines and combustion devices, and that certain features of the invention are usable independently of others. Specifically, it may be noted that since the differences between vapor and gas may be insignificant in many cases, the vapor pumping system to be described is also applicable to handling gaseous fuel.

By way of background, it may be pointed out that most jet engines for aircraft burn liquid fuel. This is true of turbojet, ramjet and pulsejet engines. The fuel is carried in the aircraft in tanks which, for structural and weight reasons, ordinarily cannot be made to withstand any great internal pressure. With aircraft of moderate speed, this fact presents no particular problem. However, with very high speed aircraft, adapted to operate at speeds of the order of Mach 3 and above, the entire aircraft, including the fuel tanks, is very considerably heated by its passage through the air. While it is possible and necessary to refrigerate certain critical areas and components of the aircraft, it is not feasible to refrigerate the fuel tanks. As a result, there is a severe problem of boiling of the hydrocarbon type fuels commonly employed. Of course, the vapor boiling off from the liquid fuel may be vented overboard to prevent destructive pressure rise in the fuel tanks, but this is wasteful and hazardous. Incidentally, the fuel in the aircraft tanks may be additionally heated by use as a heat sink for cooling systems in the aircraft.

One possible approach to the solution of this problem lies in constructing an engine to operate on the vaporized fuel. However, analysis shows that this is unfeasible. A very large additional amount of heat would be required to vaporize all of the fuel required by the engine under full power operation, that is, at maximum fuel rate. Also, a great deal of power would be required to compress the vaporized fuel to a pressure sufficient to introduce it into the engine against the air pressures within the engine. In this connection, during low speed flight at low altitudes, there would be no significant fuel heating due to the ram temperature rise of the ambient air, and substantially all of the vaporization would have to be accomplished by addition of heat in some form, as by burning part of the fuel to vaporize the remainder. Apparatus for this purpose would be heavy and bulky.

My invention may be summarized by stating that it is directed to providing an engine, and particularly a fuel system therefor, which is adapted to operate normally and at full efficiency on liquid fuel, and is also adapted to substitute vaporized fuel for part or substantially all of the liquid fuel to satisfy the engine requirements when and if vaporization of the fuel by aerodynamic heating creates sufficient vapor pressure in the fuel tanks. As a result, except under extremely abnormal conditions, there is no waste of the vaporized fuel, and the tank pressures may be kept to a tolerable level without blowing off the vapor. The invention takes advantage of the vaporization of the fuel by aerodynamic heating instead of fighting it. There are problems involved in the handling of vapor fuel, but the system according to my invention provides means for meeting these problems successfully.

The nature of the invention and the advantages thereof will be apparent to those skilled in the art from the succeeding detailed description of the preferred embodiment thereof and the accompanying drawings.

*Engine and Controls in General*

Figure 1:
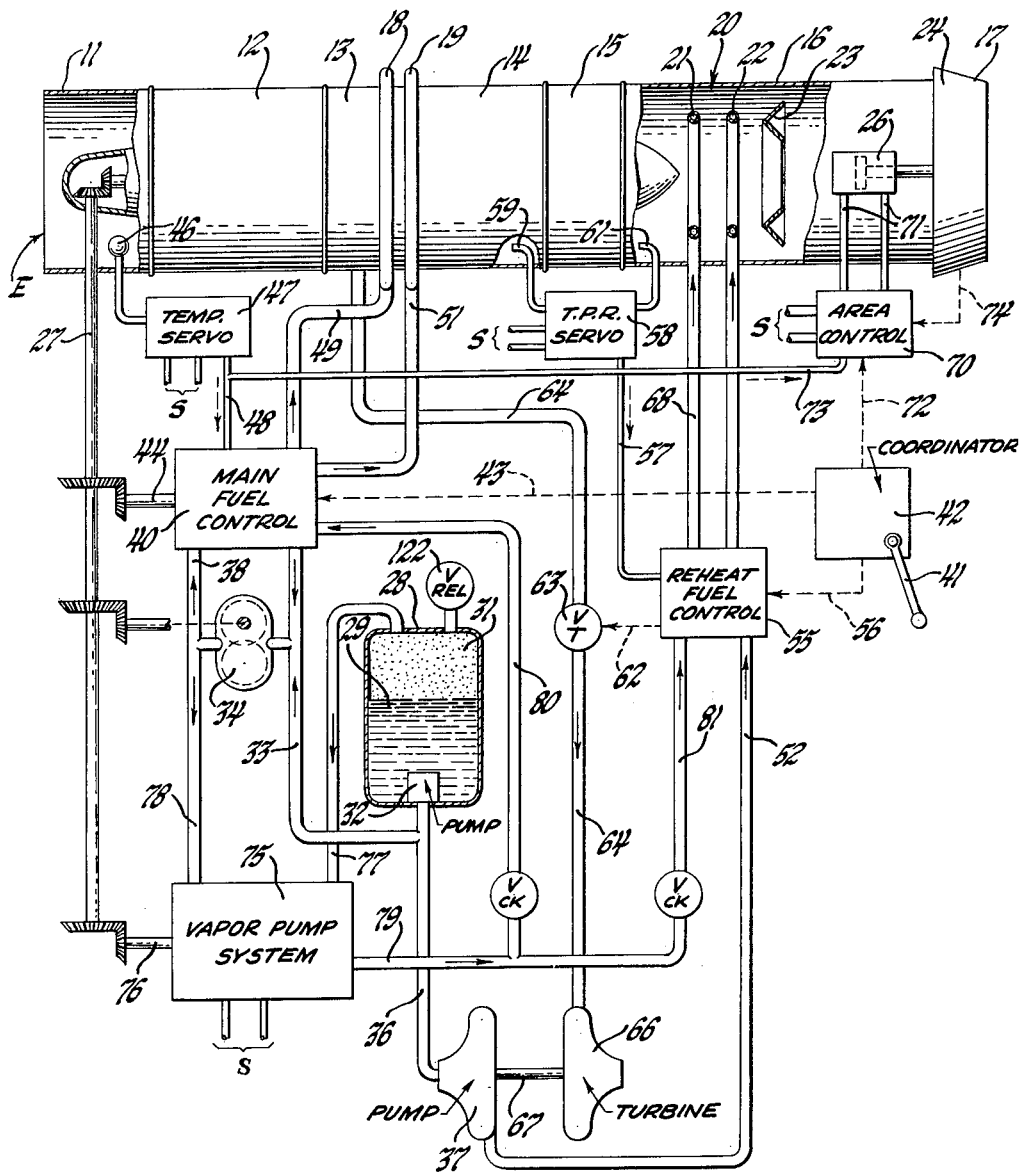
FIGURE 1 is a schematic drawing of a fuel system according to the invention associated with an afterburning turbojet engine.

Referring first to FIGURE 1, there is illustrated a turbojet engine E of standard configuration including an air inlet section 11, a compressor 12, a diffuser section 13, combustion apparatus 14, a turbine 15, an exhaust duct 16, and a variable area jet nozzle arrangement 17. Air entering through inlet 11 is compressed by the compressor 12 and supplied through the diffuser 13 to the combustion apparatus 14, which will be referred to hereafter for conciseness as the main burner. Fuel is burned in the burner 14, and the resulting combustion products drive the turbine 15. The turbine drives the compressor 12 through shaft means (not illustrated). Liquid fuel is supplied to suitable fuel nozzles in the main burner from a manifold 18 and vapor or gaseous fuel is likewise supplied to the main burner by any suitable means from a manifold 19.

The exhaust duct 16 houses an afterburner or reheat burner 20 including a liquid fuel manifold or spray ring 21 and a vapor fuel discharge manifold 22. A suitable flameholder, which may comprise the usual annular V-shaped gutters 23, is provided. Combustion takes place in the exhaust duct 16 when fuel is introduced through the fuel manifolds 21 or 22 and ignited by suitable means, not illustrated. The exhaust nozzle 17 may be of any suitable variable area type, the structure of which is immaterial to the invention. It is illustrated as being of the type wherein the configuration is controlled by a shroud 24 connected to a number of actuating cylinders 26, only one of which is shown, which move the shroud 24 axially of the engine to vary the throat and exit areas, for example, of the nozzle. The engine also includes an accessory drive shaft 27 driven by the turbine which is coupled to various engine auxiliaries. The structure of the engine, as schematically illustrated, is conventional except for the presence of both liquid and vapor fuel supplies.

Fuel is supplied to the engine from a suitable fuel tank or tanks (one tank 28 being illustrated) mounted in the aircraft. The tank contains a quantity of liquid fuel 29 and contains fuel vapor in the upper part 31 of the tank above the liquid fuel. A suitable boost pump or boost pumps 32 in the bottom of the tank supply liquid fuel through a line 33 to a main fuel pump 34 and through a line 36 to a reheat fuel pump 37. Pump 34 may be a positive displacement pump such as a gear pump driven through the accessory drive shaft by the engine. The pump delivers liquid fuel under pressure through a line 38 to a main fuel control 40 which may, except for the structure hereinafter pointed out which adapts it to handle both liquid and vapor fuel, be of any suitable usual type. Such fuel controls ordinarily include means under control of the aircraft pilot for setting an engine power level and means responsive to parameters or conditions of engine operation for controlling the supply of fuel to the engine to cause it to run in accordance with the pilot's power control setting. They also ordinarily include means for assuring stable compression and combustion and for preventing dangerous levels of temperature, speed, or pressure in the engine. Since such matters are of no direct moment to the invention, they will not be enlarged upon.

As illustrated schematically in FIGURE 1, the main fuel control 40 is subject to control by a pilot's power lever 41 which may act through a coordinator or cam box 42 and is coupled by any suitable mechanical or other transmission indicated by the line 43 to the fuel control to effect a power setting. The power setting, in the case of the turbojet engine, may typically be a setting of turbine speed. The fuel control receives an input of engine speed for governing purposes through a shaft 44 geared to the accessory drive shaft 27. It may also receive an input of inlet air temperature derived from a temperature bulb 46 in the engine inlet. The temperature signal may be supplied through a temperature servo 47 which may provide a hydraulic pressure signal representative of the inlet temperature. Since such a servo device is optional and its structure immaterial, it will not be described. The servo may have inlet and outlet lines for servo fluid from any suitable source, indicated by the letter S. The pressure signal is transmitted from the servo to the main fuel control through a line 48.

Liquid fuel metered or controlled by the main fuel control 40 is supplied to the manifold 18 through a line 49. The main fuel control also controls the supply of vapor fuel to the manifold 19 through a line 51. However, description of the vapor system will be deferred until completion of a description of the liquid fuel and nozzle area control systems.

The liquid fuel delivered from the tank through line 36 is supplied by pump 37, which may be a centrifugal pump, through a line 52 to a reheat fuel control 55.

The reheat fuel control may be of various types, so long as the control is compatible with the main fuel control and with the requirements of the engine. It may be similar to known reheat fuel controls except for the addition of means enabling it to handle both liquid and vapor fuel. The reheat fuel control is under control by the pilot's lever 41 through the coordinator 42 and a suitable control connection indicated by the broken line 56. Ordinarily, the reheat burner is put into operation only after the gas turbine is operating at or near its full power level in order to provide augmentation of the engine thrust. Whether the afterburner is used only under emergency conditions or is used normally during flight of the aircraft is a matter of the requirements of the installation. The system of the invention is particularly adapted to an installation in which the reheat burner is in operation at most times during operation of the engine. However, this is not essential, and major aspects of the invention are applicable to engines which do not have a turbine or do not have a reheat burner; for example, a ramjet engine.

As the reheat fuel control is illustrated schematically, it responds to a signal sent through the transmission 56 which calls for afterburning and sets a schedule of turbine pressure ratio, the control metering the reheat fuel to maintain the scheduled turbine pressure ratio. The input of turbine pressure ratio to the reheat control 55 may be supplied through a pressure conduit 57 from a suitable servomechanism or transducer 58 which receives an input of turbine inlet pressure from a probe 59 and an input of turbine discharge pressure from a probe 61. The pressure ratio servo may be supplied with operating medium from the lines S. The structure of such a servo device is immaterial to the invention, and therefore it is not described. The reheat fuel control 55 may be coupled by any suitable means, indicated by the broken line 62, to a throttling valve 63 which controls the operation of pump 37 and may be employed to energize the pump when afterburning operation is desired. Valve 63 controls flow through a pipe 64 which supplies compressor discharge air from the diffuser section 13 to an air turbine 66 coupled to the pump 37 by a shaft 67. The reheat fuel control delivers metered or throttled liquid fuel to the afterburner manifold 21 through a line 68. The reheat fuel control 55 ordinarily includes a shutoff valve, afterburner ignition control means, and, in some cases, means for supplying fuel selectively to a number of manifolds such as 21. These are not illustrated, being immaterial to my invention.

The other major component of the engine control is a jet nozzle area control 70 which is supplied with servo fluid from the lines S and is connected through hydraulic lines 71 to the power cylinders 26 which operate the shroud 24. The area control is illustrated as one which controls nozzle area to a schedule determined by the position of power lever 41 and modulated by engine inlet temperature. Therefore, the control receives a controlling signal from the coordinator 42 through a suitable connection indicated by the broken line 72, an inlet temperature signal from the servo device 47 through a pressure line 73, and a feedback of the position of shroud 24 representing nozzle area through a suitable mechanical or other connection indicated by the broken line 74. The details, or even the general character of the nozzle area control, are immaterial to the invention. As always, this control must be compatible with the other engine controls.

*Vapor Fuel Pumping System*

Figure 2:
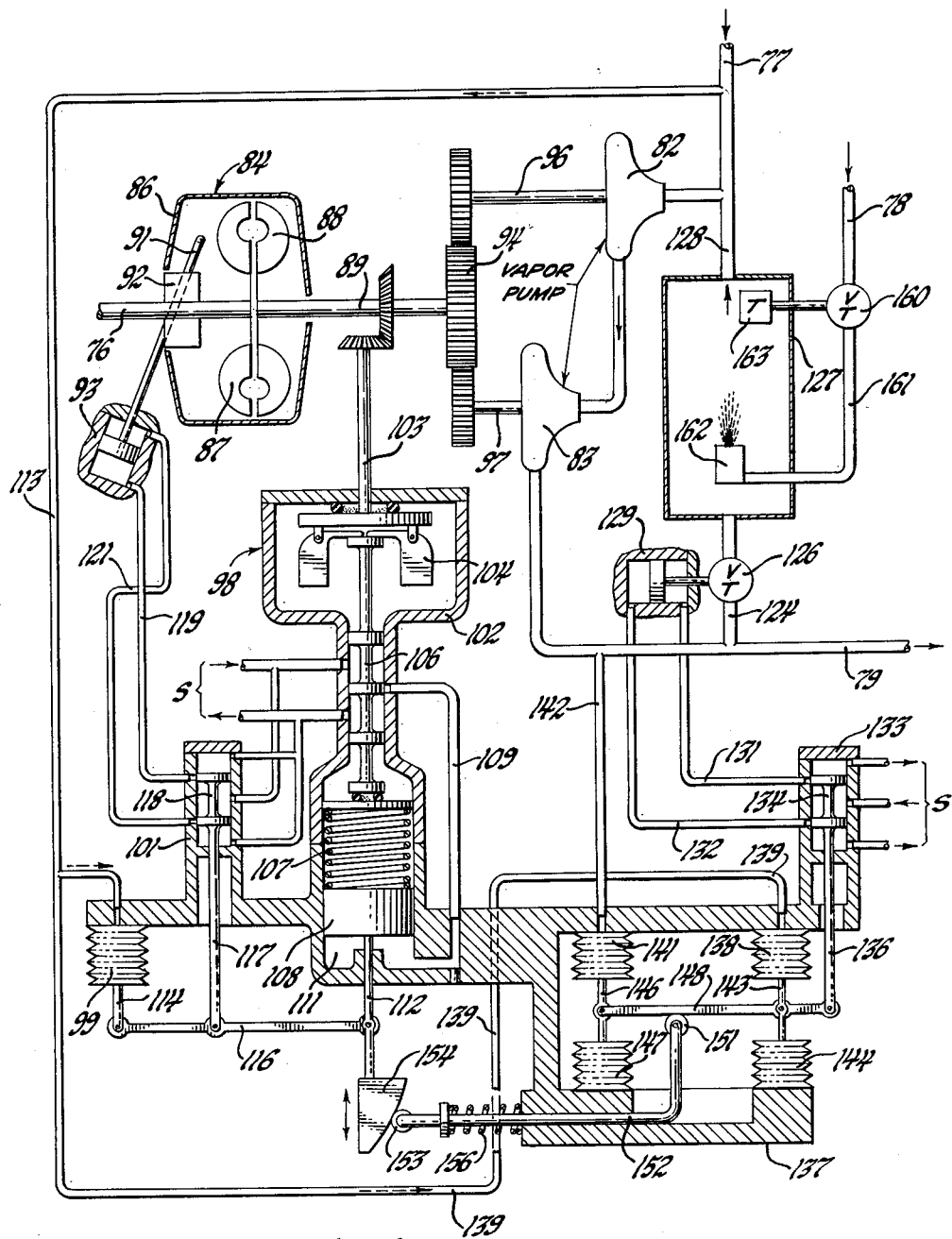
FIGURE 2 is a schematic diagram of the vapor pump system included in the system of FIGURE 1.

Proceeding to the vapor fuel pumping system, the principal parts of this are illustrated in FIGURE 2. The relation of the system of FIGURE 2 to the remainder of the engine fuel and control system is illustrated in FIGURE 1. The vapor pump system as a whole, indicated by 75 in FIGURE 1, includes vapor compressing or pumping means, controls therefor, and means for cooling bypassed vapor. Power to drive the vapor compressors is taken from the accessory drive shaft 27 through gearing and a shaft 76. Vapor is supplied from the upper portion 31 of tank 28 through a vapor conduit 77. Servo fluid to power servo-mechanisms in the system 75 is supplied from a source indicated by S. Liquid fuel to cool the bypassed vapor, if necessary, is supplied from the output of main fuel pump 34 through a line 78. Vapor fuel is supplied to the engine through a line 79 connected to the main fuel control through branch line 80 and to the reheat fuel control through branch line 81. Check valves in these lines prevent backflow of fuel into line 79.

Referring to FIGURE 2, the vapor fuel line 77 is connected to the inlet of a first stage centrifugal compressor 82, the outlet of which is connected to the inlet of a second stage centrifugal compressor 83, the outlet of which is connected to the vapor fuel engine supply line 79. Two compressors in series are shown because, with the usual internal pressure levels of turbojet engines, it is impractical to raise the fuel to the necessary pressure level with a single centrifugal compressor. To supply fuel to the engine, the fuel pressure must be greater than the pressure within the engine. The compressors 82 and 83, or equivalent, may be referred to as the vapor pump. While the pressure of the fuel vapor will be above ambient atmospheric pressure, it will ordinarily be a rather low pressure. A practical pressure level for aircraft fuel tanks will be something like 10 to 15 p.s.i.g. The vapor pumping system may operate at considerably lower levels of vapor pressure in the fuel tank. However, if the fuel pressure requirement may be satisfied by a single compressor, obviously one may be employed.

The compressors are driven from the engine through shaft 76 and a variable speed transmission 84, which is preferably a variable speed hydraulic coupling of the scoop-tube type such as that described in U.S. Patent 2,491,483. The coupling comprises a casing 86 and a pump 87 mounted on and driven by the power input shaft 76. It also includes a turbine 88 mounted on a power output shaft 89. A scoop tube 91 is mounted in a fixed hub or support 92 so that it may be moved radially of the casing 86 by a fixed power cylinder or servomotor 93 to vary the fluid content of the coupling 84. The scoop-tube coupling acts as a variable speed power transmission. Since its operation is understood by those skilled in the art and the details are immaterial to this invention, it will not be further explained. The device 84 is merely illustrative of numerous variable speed drive means for the vapor pump, driven directly by the engine E or by any other suitable power source. A variable speed controlled power device could also be employed to drive the vapor pump. The drive shaft 89 is coupled through gearing 94 to the shafts 96 and 97 of the compressors 82 and 83, respectively. Preferably, the high pressure compressor 83 is driven at higher speed than the low pressure compressor 82.

*Vapor Pump Speed Control*

The system of FIGURE 2 includes means to activate the vapor pump when the vapor pressure in tank 29 reaches a value indicative of substantial generation of vapor so that utilization of the vapor in the engine is advisable. The pressure level at which the compressor is energized should be substantially below the maximum allowable vapor pressure. The control also acts to increase the pump speed as tank vapor pressure increases, so that the fuel output of the pump can keep pace with the generation of vapor in the tank and thus prevent the vapor pressure from becoming unduly high. Suitable control means for this purpose are illustrated in FIGURE 2. The principal elements of the pump drive control means are a governor or speed responsive device 98, a bellows 99 responsive to tank output or compressor inlet vapor pressure (these being essentially the same), a control valve 101, and the servo cylinder 93 previously referred to. The governor, as illustrated, is a conventional isochronous governor of the force balance servo type. It comprises a casing or housing 102 and an input shaft 103 geared to the shaft 89 mounting flyweights 104 which bias a spool valve 106 in opposition to a speeder spring 107.

The speeder spring is loaded by a servo piston 108 reciprocable in a cylinder defined by the body 102. Servo fluid is supplied to the valve 106, which is connected by a conduit 109 to the chamber 111 below piston 108. Any change in speed of shaft 89 will cause the position of the flyweights and therefore of valve 106 to change and thus supply or exhaust servo fluid to or from chamber 111 to move piston 108 and vary the compression of spring 107 until the valve spool 106 is again centered so that it blocks line 109. This is merely an illustration of one suitable speed responsive mechanism. The speed output of the governor 98 is represented by reciprocation of a stem 112 extending from piston 108.

The pressure responsive capsule or bellows 99 is connected through a pressure line 113 to the conduit 77 connecting the fuel tank to the compressors. The reciprocation of stem 114 extending from the pressure responsive device is therefore a function of the vapor pressure. A floating lever 116 is pivoted to stem 114 and to stem 112 actuated by the governor. The stem 117 connected to valve spool 118 of the servo valve 101 is pivoted to an intermediate point of floating lever 116. Valve 101 is a conventional two-way control valve supplied with servo fluid from any suitable source S and connected through lines 119 and 121 to the dipstick control cylinder 93. Increase in fuel pressure and decrease in compressor speed tend to move valve spool 118 downwardly, supplying fluid to cylinder 93 to move the dipstick 91 toward the center of the coupling and thereby increasing the stiffness of the coupling and the speed of rotation of the vapor pump. Conversely, decrease in vapor pressure or increase in compressor speed acts to reduce the quantity of fluid in the coupling 84 to decrease the pump speed. The net result is that pump speed is governed to a value determined by vapor pressure. The calibration of the control should be such that with piston 108 in its position of lowest available governor setting, valve 118 will be in position to supply servo fluid to drive the scoop 91 to its outer limit position until a desired minimum vapor pressure level is reached. In other words, the compressors 82 need not be operated until there is sufficient vapor pressure to indicate the availability of sufficient vapor to make operation of the vapor fuel system feasible. Also, the pressure at the pump inlet 77 should be high enough that, when multiplied by the pressure ratio of the pumps, it will be greater than the normal pressure level of the gas in the engine exhaust duct 16. While the small residual amount of oil in the coupling 84 may windmill the compressor at a low speed, this is not considered to be material. If desired, a brake for the shaft 89 might be provided which is released only at some predetermined vapor pressure. Such a brake could be controlled directly by bellows 99 or any equivalent device. A rate feedback or hysteresis may be included in the control of cylinder 93 to prevent hunting of the pump drive control.

It will be apparent, therefore, that the vapor pump system responds to the presence of a threshold level of vapor pressure and the amount of energy supplied to the vapor pump increases as the vapor pressure rises, indicating that fuel boil-off exceeds the discharge of the vapor from the fuel tank by the pump. The maximum capacity of the vapor pump should be such as to be capable of handling the maximum amount of vapor which can be expected to boil off, or the maximum amount of vapor which can be handled by the engine, whichever is less. It is desirable that the engine be capable of handling any amount of vapor which may be generated by heating, but, if it is not, and extended operation under such conditions raises the vapor pressure to a potentially hazardous level, the tank 28 may be vented by a relief valve 122 (FIG. 1). Also, a pressure gauge or signal indicating the vapor pressure in the tank should be provided for information of aircraft personnel.

Figure 5:
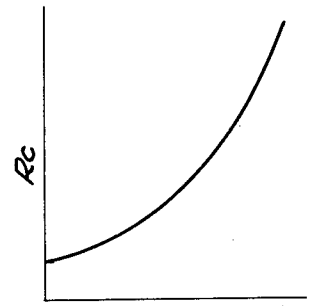
FIGURE 5 is a curve of the relation of vapor fuel compressor pressure ratio to the speed of the fuel compressor.

Before proceeding further with the description of the vapor pump system, it may be well to point out that the vapor pressure in the tank is normally much lower than the pressure required to feed the vapor to the reheat burner, which, in turn, is lower than the pressure required to feed the vapor to the main burner. The overall pressure ratio of the series compressors 82 and 83 is determined primarily by design and the rotational speed of the compressors. The characteristic curve of pressure ratio against speed is generally as indicated by FIGURE 5. This curve is the surge line, or line of pressure ratio above which the compressors will surge and fail to deliver fuel, for any given speed of rotation. The coordination of the compressor speed control with the normal operating speed of the engine as transmitted to shaft 76 should be such that the pressure ratio is sufficient to supply vapor fuel to the afterburner when the compressors are brought up to speed. However, the pressure level in the reheat burner varies widely with operating conditions. If the rate of generation of vapor exceeds the rate at which it is being pumped out, compressor speed will rise, and also the inlet pressure in line 77 will rise, so that the output pressure in line 79 will increase by virtue of both of these factors. Ultimately, the pressure in line 79 may rise high enough to exceed the pressure in the main burners, at which point vapor may also be supplied to the main burner. This fuel may increase up to the maximum vapor fuel requirement of the main burner. Beyond this, if vapor generation continues to exceed utilization thereof, the excess vapor must be blown off by the relief valve 122. If changing conditions reduce the rate of boil-off of the fuel in tank 28, the supply of vapor to the main burner gradually decreases and, when there is only enough for the afterburner, no vapor is supplied to the main burner. As the vapor still further decreases, the supply of vapor fuel to the reheat burner is decreased, and may fall to zero.

*Vapor Pump Bypass Control*

It will be apparent from the foregoing that the compressors 82 and 83 must start under load and may run at times with a blocked or throttled outlet. In other words, no fuel can be discharged through line 79 until the discharge pressure of the fuel compressors is greater than the pressure in the reheat burner plus incidental flow losses. If the compressor outlet is throttled so as to require too high an output pressure in relation to flow and compressor speed, the compressors will surge. Some means to maintain stable compressor operation is required. This requirement is satisfied by a bypass connecting the outlet line 79 with the inlet line 77 so that the pumps may recirculate all or a portion of the vapor. In view of the relation between compressor outlet pressure for stable operation and compressor speed as indicated by FIGURE 5, the bypass is controlled by means responsive to compressor pressure ratio.

The bypass comprises a conduit 124 in which is connected a throttle valve 126, a bypass fuel cooler 127 which will be explained subsequently, and a line 128 connecting the outlet of the cooler to the vapor inlet line 77. Valve 126 may be operated by any suitable power means such as a standard piston and cylinder hydraulic motor 129 connected to the movable element of the valve 126. Valve 126 may be, for example, a butterfly or gate type valve. Power cylinder 129 is connected by servo fluid lines 131 and 132 to a standard two-way control valve 133 connected to the source S of servo fluid. Valve 133 includes a movable valve spool 134 connected by a stem 136 to the control mechanism which responds to pressure ratio and speed. The bypass control may be mounted on a frame 137 connected to the governor housing 102. It comprises a bellows or capsule 138 responsive to pump inlet pressure transmitted through lines 113 and 139. It also includes a pump discharge pressure bellows 141 connected to outlet line 79 by pressure line 142. Bellows 138 is connected by a rigid strut 143 to an evacuated ambient pressure compensating bellows 144 of equal area to bellows 138. Bellows 141 is similarly connected by a strut 146 to an evacuated compensating bellows 147. Struts 143 and 146 are pivoted to a lever 148, one end of which is pivoted to the stem 136 of the bypass control pilot valve 133.

Lever 148 rocks about a shiftable fulcrum defined by a roller 151 mounted on a push rod 152 slidably mounted in the support 137. The other end of push rod 152 mounts a cam follower 153 which cooperates with a suitably contoured cam 154 mounted on the stem 112, which, as previously described, moves in response to the value of vapor pump speed. Means such as a compression spring 156 may bias the follower 153 against the cam. Cam 154, by determining the relative lever arms of bellows 141 and 138 with respect to fulcrum 151, sets a value of pressure ratio at which the forces exerted by the bellows will be in balance. The pressure ratio called for by cam 154 should be according to the characteristic curve of FIGURE 5 which follows the relation of compressor ratio to speed which is just below the surge line of the compressors. If the pressure ratio is less than that available at the particular speed, the pressure in bellows 138 will overcome that in bellows 141 and move valve spool 134 downwardly to supply servo fluid through line 132 to motor 129 and move the throttling valve 126 in a closing direction, thus reducing the amount of gas bypassed. Conversely, if the speed decreases or pressure ratio increases so that surge is incipient, the opposite action will take place and the bypass valve will be moved in an opening direction.

Assuming the compressors have not started, or are at a very low speed so that piston 108 is in its lowermost position, the fulcrum 151 should be so located that, with the outlet pressure substantially equal to the inlet pressure, inlet pressure bellows 138 will override the outlet pressure bellows 141 and move valve spool 134 downwardly. Servo fluid will be supplied through line 132 until valve 126 is fully closed. As compressor speed increases, fulcrum 151 is shifted toward bellows 141 to set the control point to a higher pressure ratio. If the set pressure ratio is exceeded, valve spool 134 is moved upwardly to open the bypass and increase flow through the compressors, and vice versa. Thus, breakdown of flow through the compressors is presented.

*The Vapor Cooler*

As previously stated, the system includes a cooler 127 to cool the vapor flowing through the pump bypass. This is necessary because recirculating the vapor in the circuit consisting of the pump, valve 126, and the bypass will heat the vapor. Since considerable energy is imparted to the vapor, the heat rise may be quite substantial. This problem may be dealt with very simply and effectively by spray cooling the bypassed vapor by spraying liquid fuel into it. The evaporation of the liquid fuel cools the vapor. It also constructively uses energy, which would otherwise be wasted in pumping losses, to increase the amount of vapor available.

In a simple form, the vapor cooler may constitute a casing 127 having a vapor inlet through line 124 and a vapor outlet through line 128. Liquid fuel is supplied from pump 34 through line 78. This fuel is controlled by a throttling and shut-off valve 160 which connects line 78 through a line 161 to a fluid spray nozzle 162. Valve 160 is controlled by a suitable thermostatic device 163 responsive to the temperature of the vapor leaving the cooler. The control device 163 begins to open the valve when the vapor temperature rises above its pre-set operating level, and will modulate the opening of valve 160 to maintain the temperature of the vapor in line 128 slightly above the boiling point of the fuel. It is important that the liquid fuel not be supplied in excess, since it is undesirable to return liquid fuel to the inlet of the vapor pump. Generation of additional vapor by evaporation of the liquid fuel may result in return of vapor through line 77 to the tank 28. This acts to increase the inlet pressure of the vapor pump, and thereby assists in raising the discharge pressure of the pump.

It is believed that the operating cycle of the vapor pump system will be clear from the foregoing, but it may be reviewed briefly. Assuming that the engine has been running on liquid fuel and that high speed flight has caused vapor pressure in the tank to rise to the threshold of operation of the vapor pump system, bellows 99 will respond to this pressure and act to increase the fluid in coupling 84 to energize the vapor pump. During the acceleration of the vapor pump, the bypass valve 124 may open to allow sufficient flow for the pump to operate in a stable portion of its characteristic curve and remain free from surge. Acceleration of the pump or increase of inlet vapor pressure will ultimately raise the pressure in line 79 to a point at which it is sufficient to supply the reheat burner through line 81. Before this point, the check valve in line 81 remains closed, preventing any back flow of combustion products from the reheat burner through line 79. As flow through line 79 begins, the bypass valve 126 ordinarly closes, and the vapor fuel system is in normal operation. If vapor pressure in the tank 28 continues to rise, the pump will increase speed and deliver still more vapor fuel. If the pumping reduces the pressure in the tank below the set limit, the vapor pump may be cut out by bellows 99.

Assuming that the supply of vapor becomes so great that it entirely replaces liquid fuel in the reheat burner, the reheat fuel control will throttle the vapor fuel to limit reheat fuel. The resulting raise in the compressor discharge pressure will continue until the pressure is sufficient to supply fuel to the main burner through line 80, upon which the check valve in line 80 will open and vapor fuel will flow to both the reheat burner and the main burner. In an engine having only one burner, the operation would be essentially the same, except there would be no sequence of operation in which one burner is supplied before the other.

*Fuel Metering Valve*

As previously stated, the main fuel control 40 and reheat fuel control 55 may be similar or identical to known fuel control devices and may be of any type suitable to the particular engine or combustion device with which they are employed, except for the adaptation to both liquid and vapor fuel. In other words, the fuel control may follow usual practice in liquid fuel control with the addition of a vapor control suitably incorporated therein. Usually, such controls meter the liquid fuel. They may be open-loop controls in which the control determines the fuel to be supplied on the basis of certain conditions, and there is no direct feedback from the engine. Usually, however, there is a feedback, at least to the extent of any limiting control. In the control system illustrated, the main fuel control has a feedback of engine speed which controls fuel to maintain engine speed at the value set by the control lever 41. The reheat fuel control has a feedback of turbine pressure ratio and adjusts the reheat fuel supplied to maintain turbine pressure ratio at the value scheduled by the power control lever 41. With controls of this sort, the adaptation to use of fuel in both phases may be accomplished by providing a throttling valve for the vapor fuel controlled by all or a part of the mechanism which controls the usual throttling or metering valve for the liquid fuel.

Figure 3:
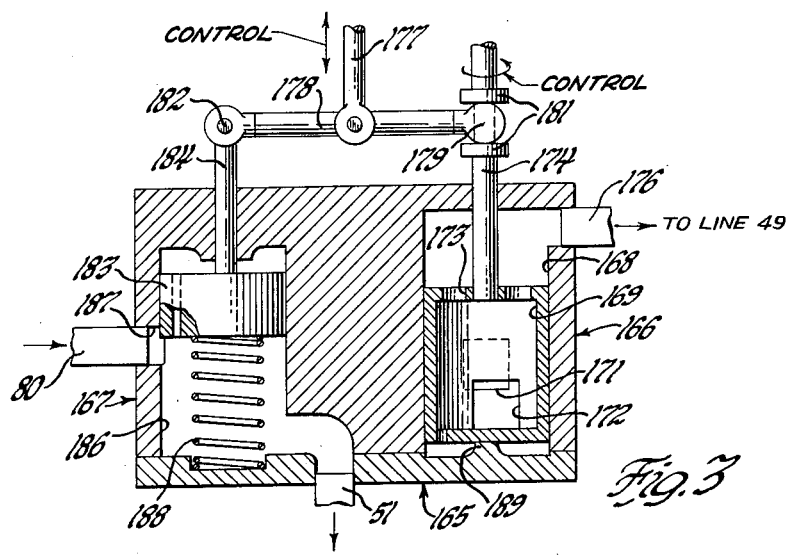
FIGURE 3 is a schematic drawing of interrelated control means for liquid and vapor fuel which constitutes a part of the main fuel control.

A simple arrangement for this purpose is illustrated somewhat schematically in FIGURE 3. A fuel valve arrangement 165 for the main fuel control 40 comprises a liquid fuel valve 166 and a vapor fuel valve 167. The liquid fuel valve 166 may comprise a cylinder 168 within which a cup-shaped metering valve member 169 is reciprocable and rotatable. Fuel is admitted to the valve from line 38 through a rectangular port 171 in the wall of cylinder 168 which coacts with a rectangular port 172 in valve member 169. Fuel flows through the area defined by the overlap of ports 171 and 172 and through openings in the upper part of the valve member 169 between spokes 173 which connect it to a rotatable and reciprocable stem 174. The metered fuel is discharged through a port 176 which connects to line 49 of FIGURE 1. Stem 174 may be rotated by any suitable control mechanism (not illustrated) which may, for example, be responsive to engine inlet temperature in the embodiment illustrated, and is reciprocated to vary the flow by a suitable governor device which responds to the difference between engine speed and the speed called for by the pilot's control lever. The governor input to valve 166 may be provided by a reciprocable stem 177 connected to a control point of a floating lever 178 having a clevised end 179 engaged between abutments 181 on the stem 174. Assuming for the present that the pivot 182 at the other end of lever 178 is stationary, it will be apparent that movement of the stem 177 varies fuel flow by varying one dimension of the metering valve, and rotation of stem 174 varies fuel flow by varying the other dimension of metering valve 166. A suitable metering head regulating valve (not illustrated) may be provided as usual to control the pressure drop across valve 166.

Stem 177 also controls the area of the vapor fuel throttling valve 167. This valve may comprise a throttling valve piston 183 connected to lever 178 by a stem 184 and reciprocable in a cylinder 186. Piston 183 varies the area of a throttling port 187 in the wall of cylinder 186 which is supplied with vapor fuel through line 80. The throttled fuel is discharged from cylinder 26 through a port which connects to line 51. A compression spring 188 biases the valve 167 in an opening direction. There is no significant axial bias on valve member 169. Therefore, in the operation of the valve assembly 165, valve 167 remains entirely open under the bias of spring 188 until valve member 169 has been moved downwardly against a stop 189 which prevents the valve from closing entirely. Further downward movement of stem 177 progressively throttles the vapor fuel port 187. Conversely, upward movement of stem 177 progressively opens the vapor fuel port until it is fully open and then begins to open the liquid fuel metering valve.

The provision of a minimum liquid fuel flow is desirable to assure some flow of liquid fuel to the main burner to prevent coking or varnishing of the usual fuel spray nozzles.

Figure 4:
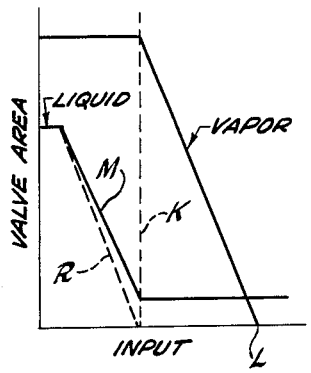
FIGURE 4 is a chart illustrating the mode of operation of the device of FIGURE 3.

The sequence of operation of the valves 166 and 167 is illustrated by FIGURE 4 in which the ordinate "Input" represents movement of control stem 177. As will be apparent, the liquid fuel is reduced from a maximum value to a minimum value along line M as the member 177 moves from its upward position to an intermediate position represented by the line K. Further movement of stem 177 reduces the vapor fuel valve area until this is reduced to zero at point L.

It will be apparent that the vapor fuel, as such, is not metered, but that it is throttled, and that the total quantity of fuel is metered to cause the engine to operate at the speed called for by the pilot's control. The particular amount of fuel supplied will depend upon various conditions such as power lever setting, ambient temperature, and forward speed of the engine. The operation of the afterburner may also affect the total fuel supplied to the main burner.

The fuel valve arrangement of the reheat fuel control 55 may be similar to that of FIGURE 3, and, therefore, it need not be illustrated. The afterburner liquid fuel metering valve may have a one-dimensional rather than a two-dimensional movement. This merely amounts to omitting the rotary input factor of stem 174. Also, it is not necessary to continue to supply liquid fuel to the reheat burner, so the liquid fuel valve of the reheat fuel control is closed completely before the vapor fuel valve begins to close. This operation is indicated by the line R on FIGURE 4. It will be understood that numerous structural arrangements to correlate the liquid and vapor fuel valves may be employed.

*Conclusion*

It will be apparent to those skilled in the art from the foregoing that the invention provides a highly satisfactory system for handling vapor fuel, and for handling vapor fuel in conjunction with liquid fuel. No special attention to the fuel system is required, since the vapor pump system and the controls therefor automatically provide for utilization of any vapor which is generated by aerodynamic heating, and substitute the vapor for the equivalent quantity of liquid fuel to maintain engine operation on the same basis as if only the liquid fuel were being used. The system can operate smoothly at any ratio of liquid to vapor subject only to the limit that, if it is deemed necessary to supply a small amount of liquid fuel to protect liquid fuel nozzles, there will be a small minimum quantity of liquid.

The detailed description of the preferred embodiment of the invention for the purpose of explaining the principles thereof is not to be construed as limiting the invention, as many modifications may be made by the exercise of skill in the art within the scope of the invention.

I claim:

1. A fuel system for a jet propulsion engine adapted to burn fuel in both liquid and vapor phases comprising, in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a compressor, unloading bypass means for the compressor operative to bypass vapor fuel from the compressor outlet to the compressor inlet to prevent surging of the compressor, and vapor cooling means in the bypass means including means for diffusing liquid fuel into the vapor fuel and means responsive to the temperature of the vapor fuel controlling the supply of liquid fuel to the cooler.

2. A fuel system for a jet propulsion engine adapted to burn fuel in both liquid and vapor phases comprising, in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a dynamic compressor, variable speed power means driving the compressor, means operative to vary the speed of the compressor coupled to the power means, unloading bypass means for the compressor operative to bypass vapor fuel from the compressor outlet to the compressor inlet to prevent surging of the compressor, and vapor cooling means in the bypass means including means for diffusing liquid fuel into the vapor fuel.

3. A fuel system for a jet propulsion engine adapted to burn fuel in both liquid and vapor phases comprising, in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a dynamic compressor, variable speed power means driving the compressor, means operative to vary the speed of the compressor coupled to the power means, the speed-varying means including means responsive to the pressure of the vapor fuel entering the compressor and to compressor speed operative to increase compressor speed as the said pressure increases; bypass means for the compressor operative to bypass vapor fuel from the compressor outlet to the compressor inlet to prevent surging of the compressor; and vapor cooling means in the bypass means including means for diffusing liquid fuel into the vapor fuel and means responsive to the temperature of the vapor fuel controlling the supply of liquid fuel to the cooler.

4. A fuel system for a jet propulsion engine adapted to burn fuel in both liquid and vapor phases comprising, in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a dynamic compressor, variable speed power means driving the compressor, means operative to vary the speed of the compressor coupled to the power means, the speed-varying means including means responsive to the pressure of the vapor fuel entering the compressor and to compressor speed operative to increase compressor speed as the said pressure increases; and unloading bypass means for the compressor operative to bypass vapor fuel from the compressor outlet to the compressor inlet to prevent surging of the compressor, the unloading means including control means therefor responsive to compressor speed and compressor pressure ratio.

5. A fuel system for a jet propulsion engine adapted to burn fuel in both liquid and vapor phases comprising, in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a dynamic compressor, variable speed power means driving the compressor, means operative to vary the speed of the compressor coupled to the power means, the speed-varying means including means responsive to the pressure of the vapor fuel entering the compressor and to compressor speed operative to increase compressor speed as the said pressure increases; unloading bypass means for the compressor operative to bypass vapor fuel from the compressor outlet to the compressor inlet to prevent surging of the compressor, the unloading means including control means therefor responsive to compressor speed and compressor pressure ratio; and vapor cooling means in the bypass means including means for diffusing liquid fuel into the vapor fuel and means responsive to the temperature of the vapor fuel controlling the supply of liquid fuel to the cooler.

6. A fuel system for a gas turbine engine adapted to burn fuel in both liquid and vapor phases comprising in combination, a closed liquid fuel tank subjected to heating with resulting vaporization of the fuel, means for pumping liquid fuel from the tank to the engine, means for pumping vapor fuel from the tank to the engine, and fuel control means adapted to regulate the rate of supply of liquid and vapor fuel connected between the said pumping means and the engine; the means for pumping vapor fuel comprising a dynamic compressor, variable speed power transmission means driven by the engine driving the compressor, means operative to vary the speed of the compressor coupled to the power transmission means, the speed-varying means including means responsive to the pressure of the vapor fuel entering the compresor and to compressor speed operative to increase compressor speed as the said pressure increases; unloading bypass means for the compressor operative to bypass vapor fuel from the compressor outlet to the compressor inlet to prevent surging of the compressor, the unloading means including control means therefor responsive to compressor speed and compressor pressure ratio; and vapor cooling means in the bypass means including means for diffusing liquid fuel into the vapor fuel and means responsive to the temperature of the vapor fuel controlling the supply of liquid fuel to the cooler.

7. A fuel system for an engine adapted to burn fuel in vapor phase comprising, in combination, means for pumping vapor fuel to the engine, and fuel control means adapted to regulate the rate of supply of vapor fuel connected between the said pumping means and the engine; the means for pumping vapor fuel comprising a dynamic compressor, unloading bypass means for the compressor operative to bypass vapor fuel from the compressor outlet to the compressor inlet to prevent surging of the compressor, and vapor cooling means in the bypass means including means for diffusing liquid fuel into the vapor fuel and means responsive to the temperature of the vapor fuel controlling the supply of liquid fuel to the cooler.

8. A fuel system for a jet propulsion engine adapted to burn fuel in a vapor phase comprising, in combination, a closed liquid fuel tank subjected to heating with resulting vaporization of the fuel, means for pumping vapor fuel from the tank to the engine, and fuel control means adapted to regulate the rate of supply of vapor fuel connected between the said pumping means and the engine; the means for pumping vapor fuel comprising a dynamic compressor, variable speed power means driving the compressor, means operative to vary the speed of the compressor coupled to the power means, unloading bypass means for the compressor operative to bypass vapor fuel from the compressor outlet to the compressor inlet to prevent surging of the compressor, and vapor cooling means in the bypass means including means for diffusing liquid fuel into the vapor fuel and means responsive to the temperature of the vapor fuel controlling the supply of liquid fuel to the cooler.

9. A fuel system for an engine adapted to burn fuel in a vapor phase comprising, in combination, means for pumping vapor fuel to the engine, and fuel control means adapted to regulate the rate of supply of vapor fuel connected between the said pumping means and the engine; the means for pumping vapor fuel comprising a dynamic compressor, variable speed power means driving the compressor, means operative to vary the speed of the compressor coupled to the power means, the speed-varying means including means responsive to the pressure of the vapor fuel entering the compressor and to compressor speed operative to increase compressor speed as the said pressure increases; unloading bypass means for the compressor operative to bypass vapor fuel from the compressor outlet to the compressor inlet to prevent surging of the compressor, the unloading means including control means therefor responsive to compressor speed and compressor pressure ratio; and vapor cooling means in the bypass means including means for diffusing liquid fuel into the vapor fuel and means responsive to the temperature of the vapor fuel controlling the supply of liquid fuel to the cooler.

10. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel from the tank to the engine, means for pumping vapor fuel from the tank to the engine, a main fuel control connecting both pumping means to the main burner, a reheat fuel control connecting both pumping means to the reheat burner, and means responsive to vapor fuel pressure in the tank operative to energize the vapor fuel pumping means above a predetermined vapor fuel pressure whereby said burners are not supplied with vapor phase fuel when said fuel tank is insufficiently heated to raise the fuel to the predetermined vapor pressure, each said fuel control including means for regulating both liquid and vapor fuel and including control means regulating the total amount of fuel supplied to the respective burner.

11. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel from the tank to the engine, means for pumping vapor fuel from the tank to the engine, a main fuel control connecting both pumping means to the main burner, a reheat fuel control connecting both pumping means to the reheat burner, means responsive to vapor fuel pressure in the tank operative to energize the vapor fuel pumping means above a predetermined vapor fuel pressure whereby said burners are not supplied with vapor phase fuel when said fuel tank is insufficiently heated to raise the fuel to the predetermined vapor pressure, each said fuel control including means for regulating both liquid and vapor fuel and including control means regulating the total amount of fuel supplied to the respective burner, the said regulating means being operative to limit liquid fuel flow prior to limiting vapor fuel flow as fuel available exceeds fuel requirement of the main or reheat burner, respectively.

12. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel from the tank to the engine, means for pumping vapor fuel from the tank to the engine, a main fuel control connecting both pumping means to the main burner, a reheat fuel control connecting both pumping means to the reheat burner, means responsive to vapor fuel pressure in the tank operative to energize the vapor fuel pumping means above a predetermined vapor fuel pressure whereby said burners are not supplied with vapor phase fuel when said fuel tank is insufficiently heated to raise the fuel to the predetermined vapor pressure, non-return valve means connected between the vapor pumping means and each fuel control, each said fuel control including means for regulating both liquid and vapor fuel and including control means regulating the total amount of fuel supplied to the respective burner, the said regulating means being operative to limit liquid fuel flow prior to limiting vapor fuel flow as fuel available exceeds fuel requirement of the main or reheat burner, respectively.

13. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel from the tank to the engine, means for pumping vapor fuel from the tank to the engine, a main fuel control connecting both pumping means to the main burner, a reheat fuel control connecting both pumping means to the reheat burner, means responsive to vapor fuel pressure in the tank operative to energize the vapor fuel pumping means above a predetermined vapor fuel pressure whereby said burners are not supplied with vapor phase fuel when said fuel tank is insufficiently heated to raise the fuel to the predetermined vapor pressure, each said fuel control including means for regulating both liquid and vapor fuel and including control means regulating the total amount of fuel supplied to the respective burner, the vapor fuel supply pressure level of the reheat burner being lower than that of the main burner so that the vapor fuel is supplied to the reheat burner up to the total fuel requirement of the reheat burner, and any excess of vapor fuel thereover is supplied to the main burner.

14. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel from the tank to the engine, means for pumping vapor fuel from the tank to the engine, a main fuel control connecting both pumping means to the main burner, a reheat fuel control connecting both pumping means to the reheat burner, means responsive to vapor fuel pressure in the tank operative to energize the vapor fuel pumping means above a predetermined vapor fuel pressure whereby said burners are not supplied with vapor phase fuel when said fuel tank is insufficiently heated to raise the fuel to the predetermined vapor pressure, non-return valve means connected between the vapor pumping means and each fuel control, each said fuel control including means for regulating both liquid and vapor fuel and including control means regulating the total amount of fuel supplied to the respective burner, the said regulating means being operative to limit liquid fuel flow prior to limiting vapor fuel flow as fuel available exceeds fuel requirement of the main or reheat burner, respectively, the vapor fuel supply pressure level of the reheat burner being lower than that of the main burner so that the vapor fuel is supplied to the reheat burner up to the total fuel requirement of the reheat burner, and any excess of vapor fuel thereover is supplied to the main burner.

15. A fuel system for a turbojet engine having main and reheat burners, and adapted to burn fuel in both liquid and vapor phases in both burners comprising, in combination, a closed liquid fuel tank subjected to heating with resulting vaporization of the fuel, means for pumping liquid fuel, a compressor for pumping vapor fuel from the tank to the engine, a main fuel control connecting a said pumping means and the compressor to the main burner, a reheat fuel control connecting a said pumping means and the compressor to the reheat burner, means responsive to vapor fuel pressure in the tank operative to energize the compressor above a predetermined vapor fuel pressure whereby said burners are not supplied with vapor phase fuel when said fuel tank is insufficiently heated to raise the fuel to the predetermined vapor pressure, and non-return valve means connected between the compressor and each fuel control, each said fuel control including means for regulating both liquid and vapor fuel and including control means regulating the total amount of fuel supplied to the respective burner.

References Cited in the file of this patent

UNITED STATES PATENTS

| | | |
|---|---|---|
| 2,263,864 | Avigdor | Nov. 24, 1941 |
| 2,576,352 | Neal | Nov. 27, 1951 |
| 2,602,289 | Anxionnaz et al. | July 8, 1952 |
| 2,690,167 | Moulton | Sept. 28, 1954 |
| 2,884,758 | Oberle | May 5, 1959 |
| 2,907,527 | Cummings | Oct. 6, 1959 |
| 2,933,894 | Johnson | Apr. 26, 1960 |